United States Patent
Asato et al.

(10) Patent No.: US 7,165,132 B1
(45) Date of Patent: Jan. 16, 2007

(54) PROCESSING NODE INCLUDING A PLURALITY OF PROCESSOR CORES AND AN INTERCONNECT CONFIGURABLE IN A TEST-MODE TO CAUSE FIRST AND SECOND TRANSACTION SOURCE INDICATORS TO BE INTERCHANGED

(75) Inventors: Creigton S. Asato, San Jose, CA (US); Kevin J. McGrath, Los Gatos, CA (US); William A. Hughes, San Jose, CA (US); Vydhyanathan Kalyanasundharam, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 186 days.

(21) Appl. No.: 10/956,650

(22) Filed: Oct. 1, 2004

(51) Int. Cl.
*G06F 13/00* (2006.01)
*G06F 9/46* (2006.01)
*G06F 19/00* (2006.01)

(52) U.S. Cl. ...................................... 710/100; 718/102
(58) Field of Classification Search ................ 710/100, 710/300, 104, 305, 6; 709/201, 253; 712/28–30; 713/1, 100; 714/726; 718/100–102; 370/241, 370/254, 912
See application file for complete search history.

(56) References Cited

U.S. PATENT DOCUMENTS

| 3,529,293 | A | * | 9/1970 | Sanders et al. ............ 340/3.31 |
| 5,444,438 | A | * | 8/1995 | Goldberg .................... 340/7.23 |
| 6,381,503 | B1 | * | 4/2002 | Dollhopf et al. .............. 700/22 |
| 6,645,884 | B1 | * | 11/2003 | Yang et al. .................. 438/791 |
| 6,915,253 | B1 | * | 7/2005 | Chapman ..................... 703/22 |
| 2004/0008713 | A1 | * | 1/2004 | Knight et al. ............... 370/428 |
| 2004/0054857 | A1 | * | 3/2004 | Nowshadi .................... 711/153 |
| 2004/0076044 | A1 | * | 4/2004 | Nowshadi .................... 365/200 |

OTHER PUBLICATIONS

"Solving the optimal attention allocation problem in manual control" by D. Kleinman (abstract only)☐☐Publication Date: Dec. 1976.*

* cited by examiner

*Primary Examiner*—Gopal C. Ray
(74) *Attorney, Agent, or Firm*—Meyertons Hood Kivlin Kowert & Goetzel, P.C.; Stephen J. Curran

(57) ABSTRACT

In one embodiment, a processing node includes a plurality of processor cores and a reconfigurable interconnect. The processing node also includes a controller configured to schedule transactions received from each processor core. The interconnect may be coupled to convey between a first processor core and the controller, transactions that each include a first corresponding indicator that indicates the source of the transaction. The interconnect may also be coupled to convey transactions between a second processor core and the controller, transactions that each include a second corresponding indicator that indicates the source of the transaction. When operating in a first mode, the interconnect is configurable to cause the first indicator to indicate that the corresponding transactions were conveyed from the second processor core and to cause the second indicator to indicate that the corresponding transactions were conveyed from the first processor core.

21 Claims, 3 Drawing Sheets

PROCESSING NODE INCLUDING A PLURALITY OF PROCESSOR CORES AND AN INTERCONNECT CONFIGURABLE IN A TEST-MODE TO CAUSE FIRST AND SECOND TRANSACTION SOURCE INDICATORS TO BE INTERCHANGED

BACKGROUND OF THE INVENTION

1. Field of the Invention

This invention is related to the field of chip multiprocessors (CMP) and, more particularly, to reconfiguration of resources within a CMP.

2. Description of the Related Art

Chip multiprocessors (CMPs) are becoming increasingly popular. A CMP has two or more processor cores implemented on the same integrated circuit (IC) device. The increase in popularity may be due, at least in part, to the notion that a CMP may be a more efficient use of the millions of transistors that may be included on an integrated circuit than, for example, a more elaborate single processor.

The testing of processors involves the generation and execution of test files that include a large number of test vectors. Due to their size, the test vectors may require long execution times and a great deal of storage. Test vector memory is one of the cost considerations when buying test equipment. When the processor is a CMP, there may be multiple processor cores in one IC. To test a CMP with two cores, for example, due to the interconnection of the two cores, a set of test vectors may be used to test one core and a second set of test vectors may be used to test the second core. In addition, a third set of test vectors may be used to test the inter-functionality of the two cores. This arrangement may strain available test vector memory and test generation time.

SUMMARY

Various embodiments of a processing node including a plurality of processor cores and a reconfigurable interconnect are disclosed. In one embodiment, each processor core may be configured to execute program instructions. The processing node also includes a controller configured to schedule transactions received from each processor core. The interconnect may be coupled to convey between a first processor core and the controller, transactions that each include a first corresponding indicator that indicates the source of the transaction. The interconnect may also be coupled to convey transactions between a second processor core and the controller, transactions that each include a second corresponding indicator that indicates the source of the transaction. When operating in a first mode, the interconnect is configurable to cause the first indicator to indicate that the corresponding transactions were conveyed from the second processor core and to cause the second indicator to indicate that the corresponding transactions were conveyed from the first processor core.

Figure 1:
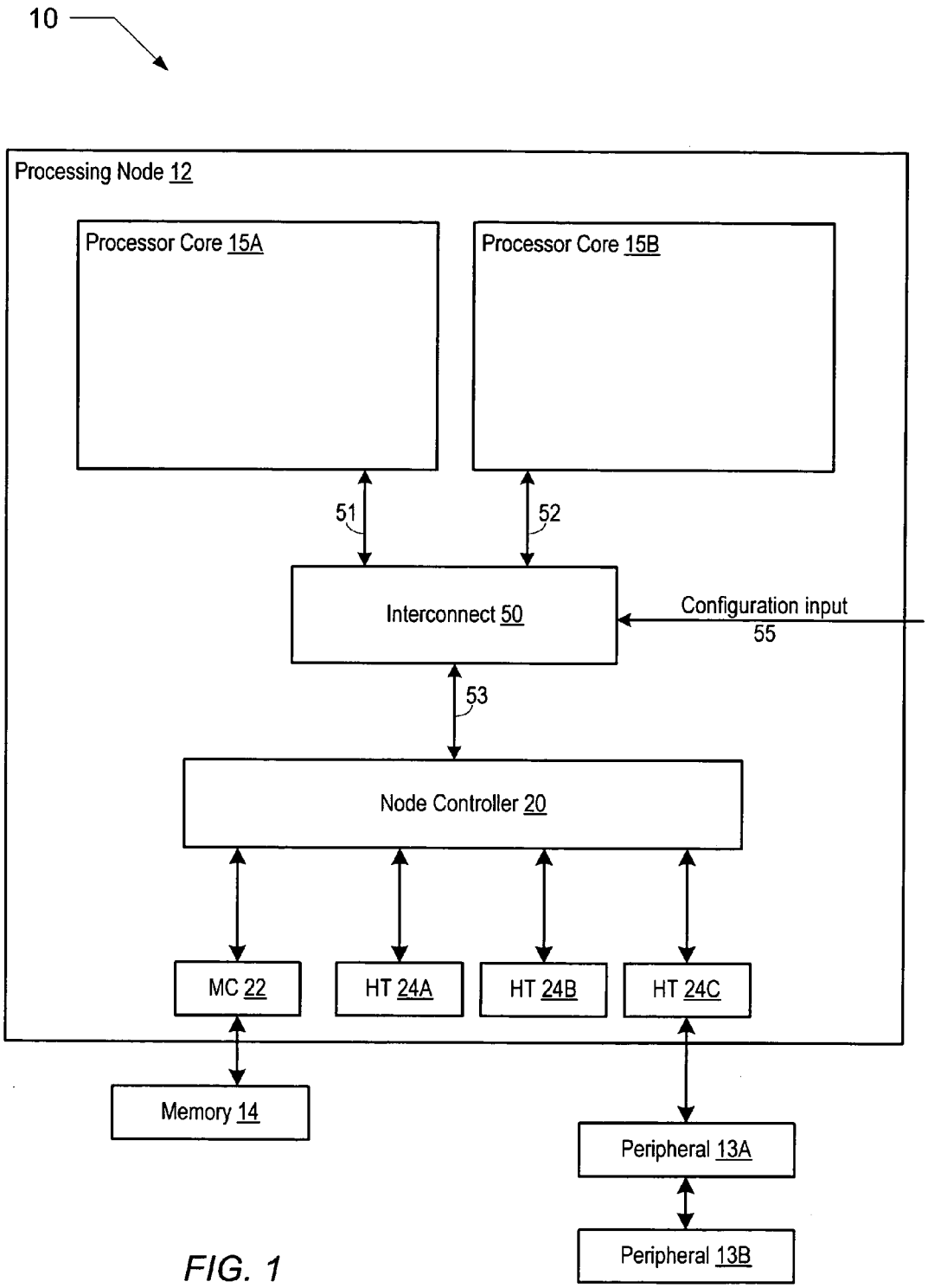
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system 10 is shown. In the illustrated embodiment, the computer system 10 includes a processing node 12 coupled to memory 14 and to peripheral devices 13A–13B. The node 12 includes processor cores 15A–15B that are coupled to a interconnect 50 via connection 51 and connection 52, respectively. Interconnect 50 is in turn coupled to a node controller 20 via connection 53. The node controller 20 is further coupled to a memory controller 22 and a plurality of HyperTransport™ (HT) interface circuits 24A–24C. The HT circuit 24C is coupled to the peripheral device 13A, which is coupled to the peripheral device 13B in a daisy-chain configuration (using HT interfaces, in this embodiment). The remaining HT circuits 24A–B may be connected to other similar processing nodes (not shown) via other HT interfaces on those nodes (not shown). The memory controller 22 is coupled to the memory 14. In one embodiment, node 12 may be a single integrated circuit chip comprising the circuitry shown therein in FIG. 1. That is, node 12 may be representative of a chip multiprocessor (CMP). Other embodiments may implement the node 12 as two or more separate integrated circuits, as desired within a single package. Any level of integration or discrete components may be used.

In one embodiment, node controller 20 may generally be configured to route communications between the processor cores 15A–15B, the memory controller 22, and the HT circuits 24A–24C dependent upon the communication type, the address in the communication, etc. In one embodiment, the node controller 20 may include a system request queue (SRQ) (not shown) into which received communications are written by the node controller 20. The node controller 20 may schedule communications from the SRQ for routing to the destination or destinations among the processor cores 15A–15B, the HT circuits 24A–24C, and the memory controller 22. In one embodiment, node controller 20 may employ a crossbar-type switching circuit (not shown) to route the communications to the various destinations.

Generally, the processor cores 15A–15B may use interconnect 50 to interface to the node controller 20 to communicate with other components of the computer system 10 (e.g. peripheral devices 13A–13B, other processor cores (not shown in FIG. 1), the memory controller 22, etc.). The interconnect 50 may be designed in any desired fashion. Cache-coherent communication may be defined for the interconnect 50, in some embodiments. In one embodiment, communication on the interfaces between the node controller 20 and the processor cores 15A–15B may be in the form of packets similar to those used on the HT interfaces. In other embodiments, any desired communication or transaction may be used (e.g. transactions on a bus interface, packets of a different form, etc.). In other embodiments, the processor cores 15A–15B may share an interface to the node controller 20 (e.g. a shared-bus interface). Generally, the communications from the processor cores 15A–15B may include requests such as read operations (to read a memory location or a register external to the processor core) and write operations (to write a memory location or external register), responses to probes (for cache-coherent embodiments), interrupt acknowledgements, and system management messages, etc.

As described in greater detail below, interconnect 50 may be a configurable interconnect between each of the processor cores 15A–15B and the node controller 20. More particularly, in one embodiment, interconnect 50 may operate in various modes. When operating in a first mode such as a test mode, for example, interconnect 50 may be configured via a configuration input port 55 to interchange the connections between each of processor core 15A and processor core 15B and node controller 20 such that transactions originating at one processor core (e.g., 15A) are made to look as if they originated at the other processor core (e.g., 15B). In one embodiment, interconnect 50 may be configurable to logically swap processor 15A and 15B. Doing so may facilitate using one set of test vectors to test both of the processor cores 15, one at a time. Furthermore, during execution of certain dual-core tests, interconnect 50 may be configurable to change an arbitration priority of the processor cores in the event that a request from each processor core arrives at interconnect 50 simultaneously. In another mode, the interconnect 50 may be configured to allow normal communications between processors 15 and node controller 20.

In one embodiment, the configuration input port 55 may be a test port such as, for example, a serial boundary-scan port that is also referred to as a Joint Test Action Group (JTAG) boundary scan port. A JTAG port is a five-pin port having signals designated TRST, TCK, TMS, TDI, and TDO. Additional details regarding this type of port may be found in the IEEE 1149 standard. As such, a value may be scanned into configuration input port 55 and stored within interconnect 50.

The memory 14 may include any suitable memory devices. For example, a memory 14 may comprise one or more RAMBUS DRAMs (RDRAMs), synchronous DRAMs (SDRAMs), double data rate (DDR) SDRAM, static RAM, etc. The memory controller 22 may comprise control circuitry for interfacing and controlling access to the memories 14. Additionally, the memory controller 22 may include request queues for queuing memory requests, etc.

The HT circuits 24A–24C may comprise a variety of buffers and control circuitry for receiving packets from an HT link and for transmitting packets upon an HT link. The HT interface comprises unidirectional links for transmitting packets. Each HT circuit 24A–24C may be coupled to two such links (one for transmitting and one for receiving). A given HT interface 24 may be operated in a cache-coherent fashion (e.g. between processing nodes) or in a non-coherent fashion (e.g. to/from peripheral devices 13A–13B). In the illustrated embodiment, the HT circuits 24A–24B are not in use, and the HT circuit 24C is coupled via non-coherent links to the peripheral devices 13A–13B.

The peripheral devices 13A–13B may be any type of peripheral devices. For example, the peripheral devices 13A–13B may include devices for communicating with another computer system to which the devices may be coupled (e.g. network-interface cards, circuitry similar to a network-interface card that is integrated onto a main circuit board of a computer system, or modems). Furthermore, the peripheral devices 13A–13B may include video accelerators, audio cards, hard- or floppy-disk drives or drive controllers, Small Computer Systems Interface (SCSI) adapters and telephony cards, sound cards, and a variety of data acquisition cards such as General Purpose Interface Bus (GPIB) or field bus interface cards. It is noted that the term "peripheral device" is intended to encompass input/output (I/O) devices.

Generally, a processor core 15A–15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A–15B may implement the x86 architecture. The processor cores 15A–15B may comprise any desired configurations, including super-pipelined, superscalar, or combinations thereof. Other configurations may include scalar, pipelined, non-pipelined, etc. Various embodiments may employ out-of-order, speculative execution or in-order execution. The processor core may include microcoding for one or more instructions or other functions, in combination with any of the above constructions. Various embodiments may implement a variety of other design features such as caches, translation look-aside buffers (TLBs), etc.

It is noted that, while the present embodiment uses the HT interface for communication between nodes and between a node and peripheral devices, other embodiments may use any desired interface or interfaces for either communication. For example, other packet-based interfaces may be used, bus interfaces may be used, various standard peripheral interfaces may be used (e.g., Peripheral Component Interconnect (PCI), PCI Express™, etc.), etc.

Figure 2:
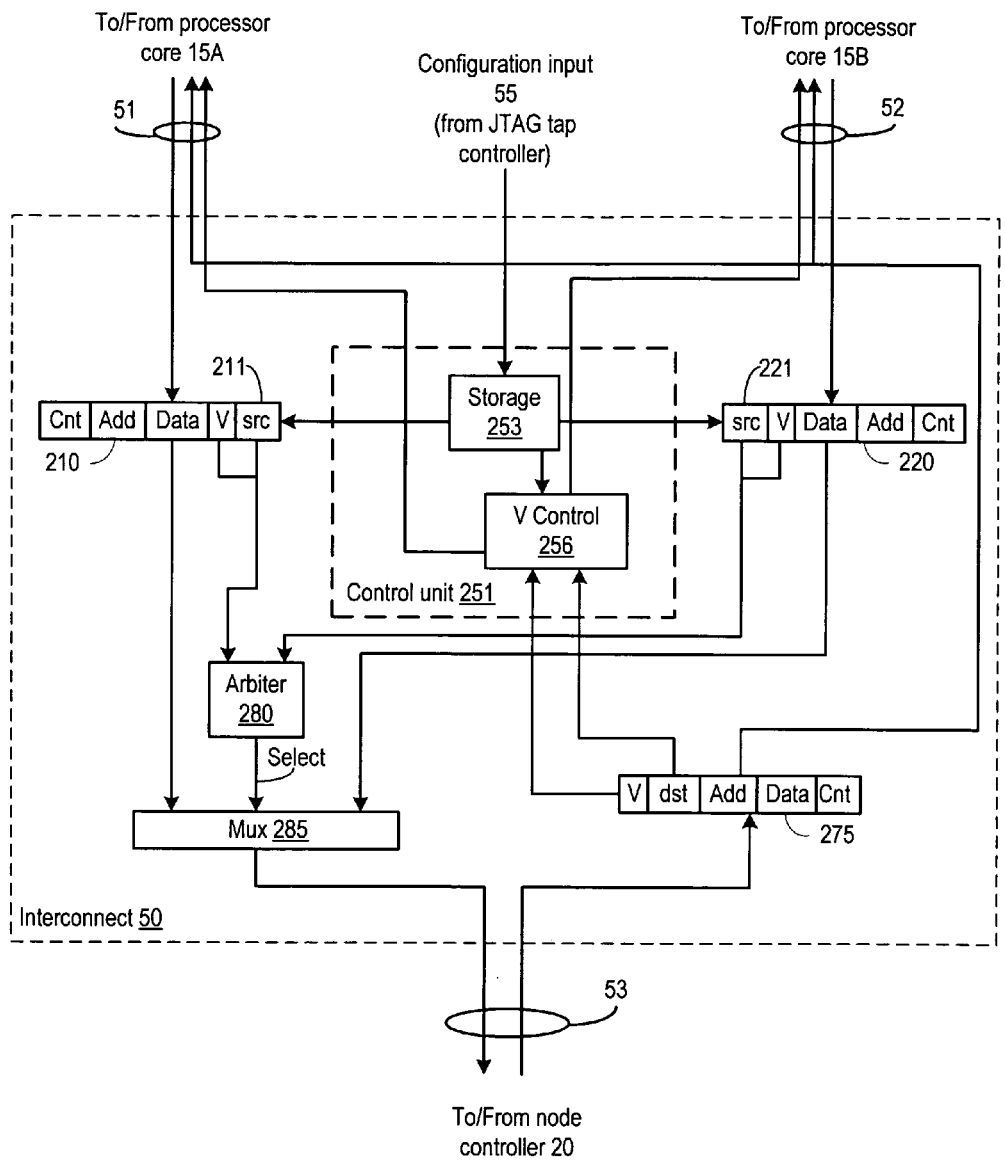
FIG. 2 is a block diagram of one embodiment of the interconnect of FIG. 1.

Referring to FIG. 2, a block diagram of one embodiment of interconnect 50 is shown. Interconnect 50 includes a control unit 251 coupled to two processor request buffers 210 and 220. Control unit 251 is also coupled to a response buffer 275. Interconnect 50 further includes an arbiter 280 coupled to control a request multiplexer 285. The request buffer 210 is coupled to receive transactions from processor core 15A via connection 51 and request buffer 220 is coupled to receive transactions from processor core 15B via connection 52. In addition, multiplexer 285 and response buffer 275 are coupled to node controller 20 of FIG. 1 via connection 53.

In the illustrated embodiment, transactions received from processor core 15A–15B may include information such as address, data, control, and a valid bit. Accordingly, buffers 210 and 220 include fields corresponding to those types of information. In addition, buffers 210 and 220 each include a source field, designated src 211 and src 221, respectively. The source field includes an indicator that indicates the source of the transaction. In one embodiment, the src field may include one or more bits that may be encoded. For example, to identify processor 15A as the source of a transaction, the src field may be encoded with a 00 and to identify processor 15B as the source of a transaction, the src field may be encoded with a 01. In one embodiment, the source information is not part of the transaction sent from either processor core, but is instead added to the transaction once the transaction is received in buffer 210 and 220. However, in other embodiments, the source information may be part of the transaction sent from the processor cores, but as described further below, may be modified.

In the illustrated embodiment, control unit 251 includes a storage 253 and a valid bit control unit designated V control 256. Storage 253 may be any type of storage such as a register, for example, that may store a configuration value. The configuration value may be stored within storage 253 at start-up or dynamically during operation. In one embodiment, the configuration value stored within storage 253 may determine what values are stored within the src fields 211 and 221. For example, in one embodiment, upon power-up and reset, a value of zero may be stored in storage 253. This zero value may cause interconnect 50 to operate in a normal mode. In this normal mode, control unit 251 may store a value in src field 211 indicating that processor core 15A is the source of transactions received in buffer 210. In addition, control unit 251 may also store a value in src field 221 indicating that processor core 15B is the source of transactions received in buffer 220.

However, during operation, a different configuration value (e.g., logic value of one) may be stored within storage 253. This different value may cause interconnect 50 to operate in a test mode. In the test mode, control unit 251 may store a value in src field 211 indicating that processor core 15B is the source of transactions received in buffer 210. In addition, control unit 251 may also store a value in src field 221 indicating that processor core 15A is the source of transactions received in buffer 220. It is noted that in one embodiment, storage 253 may be accessed during operation via configuration input port 55, which may be a JTAG port as described above. By swapping the src indicators, the processor cores and their respective connections have been effectively logically swapped. As described above, swapping the processor core connections may facilitate using one set of test vectors to test both of the processor cores 15.

Further, in one embodiment swapping the processor core connections may also allow a different core to be used as a boot-strap processor (BSP) in the event that the first processor core is non-functional. In such an embodiment, the src fields may be changed to indicate that a different core is the BSP; thereby allowing the processing node 12 to boot up and function with at least one processor core.

In the illustrated embodiment, transactions received into buffer 275 from node controller 20 may include information such as address, data, control, destination and a valid bit. Thus, buffer 275 may include fields corresponding to that information. The destination value may be a value that corresponds to processor core 15A or processor core 15B. In one embodiment, the destination value may be similar to the src values (e.g., a 00 or 01, respectively).

In one embodiment, the response transactions sent from node controller 20 may be presented to both of processor cores 15A–15B. However, only one of the processor cores (e.g., the processor core that was the source of the corresponding request transaction) will see a valid bit that indicates a valid transaction. The valid bit presented to the processor cores may not be the valid bit that was sent from node controller 20. For example, V control 256 may generate a new valid bit for each of the processor cores 15A–15B. In one embodiment, V control 256 may compare the destination value of the response transaction in buffer 275 to the src value in 211 and 221 to determine to which processor core the response should go. V control 256 may generate a valid bit that indicates a valid transaction for the processor core associated with the src value that matches the destination value. Thus, only the processor core that sees a transaction and a valid bit that indicates a valid transaction may latch the response transaction.

Figure 3:
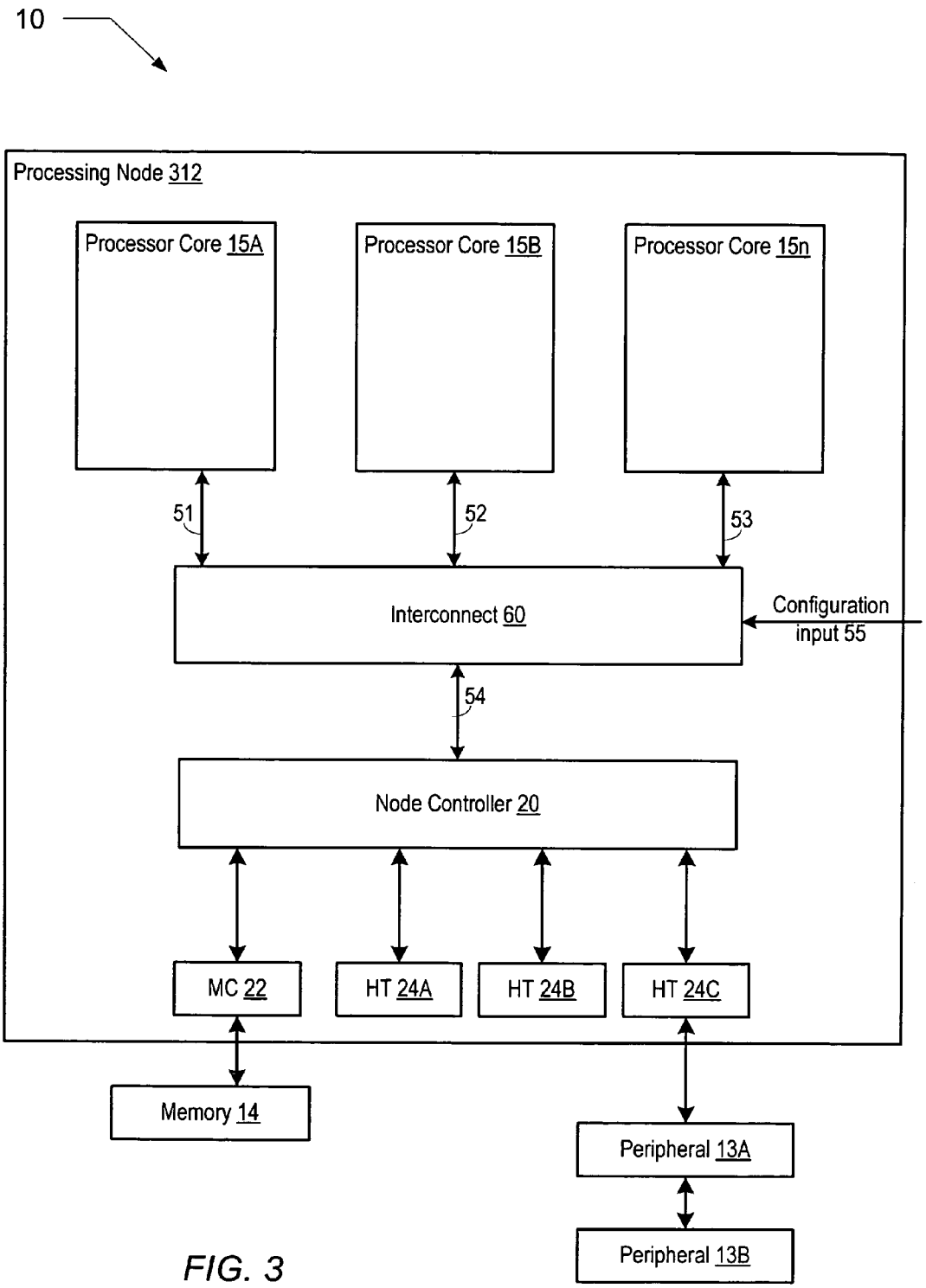
FIG. 3 is a block diagram of another embodiment of a computer system.

It is noted that, while the computer system 10 illustrated in FIG. 1 includes one processing node 12, other embodiments may implement any number of processing nodes. Similarly, as illustrated in FIG. 3, a processing node such as node 12 may include any number of processor cores, in various embodiments. In addition, various embodiments of the computer system 10 may also include different numbers of HT interfaces per node 12, and differing numbers of peripheral devices 13 coupled to the node, etc.

Referring to FIG. 3, a block diagram of another embodiment of a computer system 10 is shown. Components that correspond to those shown in FIG. 1 are numbered identically for clarity and simplicity. Similar to the computer system 10 of FIG. 1, computer system 10 of FIG. 3 includes a processing node 312 coupled to a memory 14 and to peripheral devices 13A and 13B. However, processing node 312 of FIG. 3 is shown with multiple processor cores, labeled processor core 15A, processor core 15B and processor core 15$n$, where n is used to denote that there may be any number of processor cores.

In the embodiment illustrated in FIG. 3, interconnect 60 may perform functions similar to the functions of interconnect 50 described in conjunction with the descriptions of FIG. 1 and FIG. 2. Specifically, interconnect 60 may be configurable to operate in various modes. When operating in a first mode such as a test mode, for example, interconnect 60 may be configured via a configuration input port 55 to interchange the connections between each of processor core 15A, processor core 15B, processor core 15$n$ and node controller 20 such that transactions originating at one processor core (e.g., 15A) are made to look as if they originated at the other processor core (e.g., 15$n$). However, since there are additional processor cores 15, there may be additional similar circuitry (not shown) included within interconnect 60. For example, in one embodiment, additional buffers (e.g., 210, 220) may be employed.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing node comprising:
   a plurality of processor cores, each configured to execute program instructions;
   a controller configured to schedule transactions received from each processor core of the plurality of processor cores; and
   an interconnect coupled to convey between a first processor core of the plurality of processor cores and the controller, transactions that each include a first corresponding indicator that indicates the source of the transaction and to convey transactions between a second processor core of the plurality of processor cores and the controller, transactions that each include a second corresponding indicator that indicates the source of the transaction;
   wherein when operating in a first mode, the interconnect is configurable to cause the first indicator to indicate that the corresponding transactions were conveyed from the second processor core and to cause the second indicator to indicate that the corresponding transactions were conveyed from the first processor core.

2. The processing node as recited in claim 1, wherein when operating in the first mode, the interconnect is further configurable to cause transactions, sent from the controller, having the first processor core as a destination to be routed to the second processor core and to cause transactions, sent from the controller, having the second processor core as a destination to be routed to the first processor core.

3. The processing node as recited in claim 1, wherein when operating in a second mode, the interconnect is further configurable to cause the first indicator to indicate that the corresponding transactions were conveyed from the first processor core and to cause the second indicator to indicate that the corresponding transactions were conveyed from the second processor core.

4. The processing node as recited in claim 1, wherein the interconnect includes a storage for storing a value that indicates whether to operate the interconnect in one of the first mode and the second mode.

5. The processing node as recited in claim 4, wherein in response to detecting a predetermined value in the storage, the interconnect is configured to operate in the first mode.

6. The processing node as recited in claim 4, wherein the processing node further includes a configuration input port used for accessing the storage and for storing the predetermined value therein.

7. The processing node as recited in claim 6, wherein the configuration input is a five-pin serial boundary scan test port that includes TRST, TCK, TMS, TDI, and TDO signals.

8. The processing node as recited in claim 1, wherein the first mode is a test mode and the transactions are responsive to a test vector stimulus.

9. The processing node as recited in claim 1, wherein the interconnect is configured to convey each transaction on a respective packet interconnect.

10. The processing node as recited in claim 1, wherein the indicator includes one or more bits of a source field of a packet in each transaction.

11. A method comprising:
providing a plurality of processor cores on an integrated circuit;
providing a controller configured to schedule transactions received from each processor core of the plurality of processor cores;
conveying transactions between a first processor core of the plurality of processor cores and the controller transactions that each include a first corresponding indicator that indicates the source of the transaction; and
conveying transactions between a second processor core of the plurality of processor cores and the controller transactions that each include a second corresponding indicator that indicates the source of the transaction;
wherein when operating in a first mode, causing the first indicator to indicate that the corresponding transactions were conveyed from the second processor core and causing the second indicator to indicate that the corresponding transactions were conveyed from the first processor core.

12. The method as recited in claim 11, further comprising when operating in the first mode, causing transactions, sent from the controller and having the first processor core as a destination, to be routed to the second processor core and to cause transactions, sent from the controller and having the second processor core as a destination to be routed to the first processor core.

13. The method as recited in claim 11, further comprising when operating in a second mode, causing the first indicator to indicate that the corresponding transactions were conveyed from the first processor core and causing the second indicator to indicate that the corresponding transactions were conveyed from the second processor core.

14. The method as recited in claim 11, further comprising storing a value that indicates whether to operate the interconnect in one of the first mode and the second mode.

15. The method as recited in claim 14, further comprising operating in the first mode in response to detecting a predetermined value in the storage.

16. The method as recited in claim 14, further comprising accessing the storage and storing the predetermined value therein via a configuration input port.

17. The method as recited in claim 16, wherein the configuration input is a five-pin serial boundary scan test port that includes TRST, TCK, TMS, TDI, and TDO signals.

18. The method as recited in claim 11, further comprising conveying each transaction on a respective packet interconnect.

19. The method as recited in claim 11, wherein the indicator includes one or more bits of a source field of a packet in each transaction.

20. A computer system comprising:
a memory; and
a processing node coupled to the memory, wherein the processing node includes:
a plurality of processor cores, each configured to execute program instructions;
a controller configured to schedule transactions received from each processor core of the plurality of processor cores; and
an interconnect coupled to convey between a first processor core of the plurality of processor cores and the controller, transactions that each include a first corresponding indicator that indicates the source of the transaction and to convey transactions between a second processor core of the plurality of processor cores and the controller, transactions that each include a second corresponding indicator that indicates the source of the transaction;
wherein when operating in a first mode, the interconnect is configurable to cause the first indicator to indicate that the corresponding transactions were conveyed from the second processor core and to cause the second indicator to indicate that the corresponding transactions were conveyed from the first processor core.

21. A processing node comprising:
a plurality of processor cores, each configured to execute program instructions;
a controller configured to schedule transactions received from each processor core of the plurality of processor cores; and
an interconnect coupled to convey between each processor core of the plurality of processor cores and the controller, transactions that each include a corresponding indicator that indicates the source of the transaction;
wherein when operating in a first mode, the interconnect is configurable to cause the indicator to indicate that the corresponding transaction was conveyed from a different processor core of the plurality of processor cores than the processor core that is the source of the transaction.

* * * * *